United States Patent
Schunk et al.

(10) Patent No.: US 6,720,171 B2
(45) Date of Patent: Apr. 13, 2004

(54) COMBINATORIAL PREPARATION AND TESTING OF HETEROGENEOUS CATALYSTS

(75) Inventors: Stephan Andreas Schunk, Heidelberg (DE); Dirk Demuth, Nussloch (DE); Hartmut Hibst, Schriesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 190 days.

(21) Appl. No.: 09/734,018

(22) Filed: Dec. 12, 2000

(65) Prior Publication Data

US 2001/0039330 A1 Nov. 8, 2001

(30) Foreign Application Priority Data

Dec. 13, 1999 (DE) .......................... 199 59 973

(51) Int. Cl.[7] ................. C12P 21/08
(52) U.S. Cl. ............. 435/188.5; 435/168; 435/287.8; 435/287.9; 435/DIG. 30; 435/DIG. 44; 435/DIG. 43; 436/181; 436/134; 436/127; 436/119; 436/113
(58) Field of Search ............... 435/188.5, 168, 435/287.8, 287.9, DIG. 30, 44, 43; 436/181, 134, 127, 119, 113

(56) References Cited

U.S. PATENT DOCUMENTS

| 5,324,483 A | * | 6/1994 | Cody et al. ................. 422/131 |
| 5,985,356 A | | 11/1999 | Schultz et al. .................. 427/8 |
| 6,030,917 A | * | 2/2000 | Weinberg et al. ............. 502/104 |
| 6,373,570 B1 | * | 4/2002 | McFarland et al. ........... 356/364 |
| 6,406,893 B1 | * | 6/2002 | Knapp et al. ............... 435/91.2 |

FOREIGN PATENT DOCUMENTS

| WO | WO 96/11878 | | 4/1996 |
| WO | WO 99/41005 | * | 8/1999 |

OTHER PUBLICATIONS

Xiang et al. "A Combinatorial Approach to Materials Discovery" Science vol. 268 (1995) pp. 1738–1740.

* cited by examiner

Primary Examiner—T. D. Wessendorf
(74) Attorney, Agent, or Firm—Keil & Weinkauf

(57) ABSTRACT

A process for preparing arrays of two or more heterogeneous catalysts, heterogeneous catalyst precursors, or combinations thereof in a body having preferably parallel through-channels. In this process, a solution, emulsion or dispersion of elements present in the catalyst, catalyst precursor, or combination thereof, is first prepared, and is used to simultaneously or successively coat the channels of the body to produce freshly impregnated moist channels. These channels are then treated and reacted with one or more reactive gases, and the coated body is optionally heated in the presence or absence of inert or reactive gases.

4 Claims, No Drawings

COMBINATORIAL PREPARATION AND TESTING OF HETEROGENEOUS CATALYSTS

The invention relates to a process for the combinatorial preparation and testing of heterogeneous catalysts and catalysts obtained by this process.

To prepare and study novel chemical compounds, in addition to classical chemistry which is directed towards the synthesis and study of individual substances, combinatorial chemistry has developed. In this approach, a multiplicity of reactants were reacted in a one-pot synthesis and analysis was carried out as to whether the resultant reaction mixture displays the desired properties, for example a pharmacological activity. If an activity was found for such a reaction mixture, it was then necessary to determine in a further step which specific substance in the reaction mixture was responsible for the activity. In addition to the high expenditure for determining the actual active compound, it was difficult with a multiplicity of reactants to exclude to unwanted side reactions.

In another combinatorial synthesis approach, a multiplicity of compounds were synthesized by specific dosage and reaction of a number of reactants in a multiplicity of different reaction vessels. In this process, preferably, in each reaction vessel one reaction product is present, so that in the event of, for example, a given pharmacological activity of a mixture, the starting materials used for its preparation are known immediately.

In addition to the first applications of this more specific combinatorial synthesis in the search for novel pharmacologically active substances, very recently the synthesis method has also been extended to low-molecular-weight organic compounds and to organic and inorganic catalysts.

X.-D. Xiang et al., "A Combinatorial Approach for Materials Discovery", Science 268, (1995), pages 1738 to 1740 describe the preparation of BiSrCaCuO and YBaCuO superconductivity films on substrates, a combinatorial array of different metal compositions being obtained by physical masking processes and vapor deposition techniques in the deposition of the appropriate metals. After the calcination, different compositions are present at different positions of the array and can be studied by microprobes, for their conductivity for example.

WO 96/11878 describes, in addition to the preparation of such superconductivity arrays, the preparation of zeolites, the amounts required in each case being metered without prior mixing from a plurality of metal salt solutions using an ink jet onto a type of spot plate, a precipitation starting on addition of the last solution. BSCCO superconductors can also be prepared by separate metering of the individual nitrate solutions of the metals required by spraying onto a type of spot plate and subsequent heating.

Various types of heterogeneous catalysts can be prepared using the known processes. However, testing the catalysts is complex and frequently cannot be performed under realistic conditions, e.g. using the required residence times of the reactants on the catalyst, since the catalysts are present, for example, on a relatively large, generally flat support and this must be charged, for example, with a gas mixture to be reacted.

It is an object of the present invention to provide a process for preparing arrays of inorganic heterogeneous catalysts or their precursors in which the resultant catalysts can be tested with low expenditure and under conditions which resemble an industrial process. In addition, the disadvantages of the existing systems are to be avoided. Corresponding arrays are also to be provided.

Therefore, DE-A-198 05 719 proposed arrays of, preferably inorganic, heterogeneous catalysts and/or their precursors made up of a body which has, preferably parallel, through-channels in which at least n channels comprise n different, preferably inorganic, heterogeneous catalysts and/or their precursors, where n is 2, preferably 10, particularly preferably 100, in particular 1000, especially 10,000. The body can be a tube-bundle reactor or heat exchanger and the channels are tubes, or a block made of a solid material which has the channels, in the form of boreholes for example.

It is an object of the present invention to provide processes for preparing arrays of heterogeneous catalysts and/or their precursors which extend the spectrum of arrays accessible via WO.

We have found that this object is achieved by the processes described below for preparing arrays of heterogeneous catalysts and/or their precursors, made up of a body which has, preferably parallel, through-channels and in which at least n channels comprise n different heterogeneous catalysts and/or their precursors, where n is 2, preferably 10, particularly preferably 100, in particular 1,000, especially 10,000.

The term "array of inorganic heterogeneous catalysts or their precursors" describes here an arrangement of different inorganic heterogeneous catalysts or their precursors on predetermined areas of a body which are spatially separate from one another, preferably a body having parallel through-channels, preferably a tube-bundle reactor or heat exchanger. The geometric arrangement of the individual areas to one another can be chosen freely in this case. For example, the areas can be arranged in the manner of a row (quasi one-dimensional) or a chessboard pattern (quasi two-dimensional). In a body having parallel through-channels, preferably a tube-bundle reactor or heat exchanger having a multiplicity of tubes parallel to one another, the arrangement becomes clear when a cross-sectional area perpendicular to the longitudinal axis of the tubes is considered: an area results, in which the individual tube cross sections reproduce the different areas separated from one another. The areas or tubes can, for example for tubes having a circular cross section, also be present in a dense packing, so that different rows are arranged from areas staggered to one another.

The term "body" describes a three-dimensional object which has a multiplicity (at least n) of through-channels. The channels thus connect two surface areas of the body and run through the body. Preferably, the channels are essentially, preferably completely, parallel to one another. In this case, the body can be made up of one or more materials and can be solid or hollow. It can have any suitable geometric shape. Preferably it has two surfaces parallel to one another in which in each case one orifice of the channels is situated. The channels preferably run perpendicularly to these surfaces. An example of a body of this type is a parallelepiped or cylinder in which the channels run between two parallel surfaces. However, a multiplicity of similar geometries is also conceivable.

The term "channel" describes a connection running through the body between two orifices situated on the body surface which, for example, permits the passage of a fluid through the body. The channel here can have any desired geometry. It can have a cross-sectional area changing over the length of the channel or, preferably, can have a constant channel cross-sectional area. The channel cross section can have, for example, an oval, round or polygonal outlet with straight or rounded connections between the corners of the polygon. Preference is given to a round or equilateral polygonal cross section. Preferably, all channels in the body have the same geometry (cross section and length) and run parallel to one another.

The terms "tube-bundle reactor" and "heat exchanger" describe collective parallel arrangements of a multiplicity of channels in the form of tubes, where the tubes can have any desired cross section. The tubes are arranged in a fixed spatial relationship to one another, are preferably present spatially separated from one another and are preferably surrounded by a shell which encloses all of the tubes. By this means, for example, a heating or cooling medium can be conducted through the shell, so that all of the tubes can be heated or cooled uniformly.

The term "block of a solid material" describes a body of a solid material (which in turn can be made up of one or more starting materials) which has the channels, for example in the form of boreholes. The geometry of the channels (boreholes) can here be chosen freely as described above for the channels generally. The channels (boreholes) need not be installed by boring, but can be left open, for example even when forming the solid body/block, for instance by extruding an organic and/or inorganic molding composition (for example by an appropriate die geometry during extrusion). In contrast to the tube-bundle reactors or heat exchangers, the space in the body between the channels in the block is always filled by the solid material. Preferably, the block is made up of one or more metals.

The term "predetermined" means that, for example, a number of different catalysts or catalyst precursors is introduced into a tube-bundle reactor or heat exchanger in such a manner that the assignation of the different catalysts or catalyst precursors to the individual tubes is recorded and can later be retrieved, for example, when determining the activity, selectivity and/or long-term stability of the individual catalyst in order to make possible an unambiguous assignment of defined measured values to defined catalyst compositions. Preferably, the catalysts or their precursors are prepared and distributed to the different tubes of the tube-bundle reactor under computer control, the respective composition of a catalyst and the position of the tube in the tube-bundle reactor into which the catalyst or catalyst precursor is introduced is stored in the computer and can later be retrieved. The term "predetermined" thus serves to differentiate from a chance or random distribution of the generally different catalysts or catalyst precursors to the tubes of a tube-bundle reactor.

The arrays according to the invention of preferably inorganic, heterogeneous catalysts and/or their precursors can be prepared according to the invention by a variety of processes:

Process a comprises the following steps:
  a1) preparing solutions, emulsions and/or dispersions of elements and/or element compounds of the chemical elements present in the catalyst and/or catalyst precursor and, if appropriate preparing dispersions of inorganic support materials,
  a2) if appropriate introducing adhesion promoters, binders, viscosity regulators, pH regulators and/or solid inorganic supports into the solutions, emulsions and/or dispersions,
  a3) simultaneously or successively coating the channels of the body with the solutions, emulsions and/or dispersions, a predetermined amount of the solutions, emulsions and/or dispersions being introduced into each channel to obtain a predetermined composition, to produce freshly impregnated moist channels.
  a4) treating and reacting with one or more reactive gases the freshly impregnated moist channels obtained after the coating, and
  a5) if appropriate heating the coated body in the presence or absence of inert gases or reactive gases to a temperature in the range from 20 to 1500° C. to dry, with or without sintering or calcining, the catalysts and/or catalyst precursors.

The process b comprises the following steps:
  b1) preparing solutions, emulsions and/or dispersions of elements and/or element compounds of the elements present in the catalyst and/or catalyst precursor and, if appropriate preparing dispersions of inorganic support materials,
  b2) if appropriate introducing adhesion promoters, binders, viscosity regulators, pH regulators and/or solid inorganic supports into the solutions, emulsions and/or dispersions,
  b3) simultaneously or successively coating catalyst supports present in the channels of the body with the solutions, emulsions and/or dispersions, a predetermined amount of the solutions, emulsions and/or dispersions being introduced into each channel to obtain a predetermined composition on the catalyst supports,
  b4) treating and reacting with one or more reactive gases the freshly impregnated moist channels obtained after the coating, and
  b5) if appropriate heating the body comprising the coated catalyst supports in the channels in the presence or absence of inert gases or reactive gases to a temperature in the range from 20 to 1500° C. to dry, with or without sintering or calcining, the catalysts and/or catalyst precursors.

Process c) comprises the following steps:
  c1) preparing solutions, emulsions and/or dispersions of elements and/or element compounds of the chemical elements present in the catalyst and/or catalyst precursor and, if appropriate preparing dispersions of inorganic support materials,
  c2) mixing predetermined amounts of the solutions, emulsions and/or dispersions with or without precipitation aids in one or more reaction vessels run in parallel,
  c3) if appropriate introducing adhesion promoters, binders, viscosity regulators, pH regulators and/or solid inorganic supports into the resultant mixture(s),
  c4) coating one or more predetermined channels of the body with the mixture or a plurality of mixtures,
  c5) repeating steps c2) to c4) for other channels of the body until the channels containing the respective predetermined catalyst and/or catalyst precursor compositions are coated,
  c6) treating and reacting with one or more reactive gases the freshly impregnated moist channels obtained after the coating, and
  c7) if appropriate heating the coated body in the presence or absence of inert gases or reactive gases to a temperature in the range from 20 to 1500° C. to dry, with or without sintering or calcining, the catalysts and/or catalyst precursors.

Preferably, it comprises the following steps,
  c1) preparing solutions of element compounds of the chemical elements present in the catalyst except for oxygen, and if appropriate preparing dispersions of inorganic support materials
  c2) mixing predetermined amounts of the solutions or dispersions with or without precipitation aids in one or more reaction vessels run in parallel with precipitation of the chemical elements present in the catalyst, c3) if appropriate introducing adhesion promoters, binders, viscosity regulators, pH regulators and/or solid inorganic supports into the resultant suspension, c4) coating with the suspension one or more predetermined tubes of the tube-bundle reactor or heat exchanger, c5) repeating steps c2) to c4) for different tubes of the tube-bundle reactor or heat exchanger until the tubes containing the respective predetermined catalyst compositions are coated, c6) treating and reacting with one or more reactive gases the freshly impregnated moist channels obtained after the coating, and c7) heating the coated tube-bundle reactor or heat exchanger in the presence or absence of inert gases or reactive gases to a temperature in the range from 20 to 1500° C. to dry, with or without sintering or calcining, the catalysts.

Process d) comprises the following steps:

d1) preparing solutions, emulsions and/or dispersions of elements and/or element compounds of the chemical elements present in the catalyst and/or catalyst precursor and, if appropriate preparing dispersions of inorganic support materials, d2) mixing predetermined amounts of the solutions, emulsions and/or dispersions with or without precipitation aids in one or more reaction vessels run in parallel, d3) if appropriate introducing adhesion promoters, binders, viscosity regulators, pH regulators and/or solid inorganic supports into the resultant mixture(s), d4) coating catalyst supports present in one or more predetermined channels of the body with the mixture or one or more of the mixtures, d5) repeating steps d2) to d4) for other (that is generally the as yet uncoated) catalyst supports in the channels of the body until (preferably all) the catalyst supports present in the channels of the body are coated with the respective predetermined (generally differing from one another) catalyst compositions and/or catalyst precursor compositions, d6) treating and reacting with one or more reactive gases the freshly impregnated moist channels obtained after the coating, and d7) if appropriate heating the body comprising the coated catalyst supports in the channels in the presence or absence of inert gases or reactive gases to a temperature in the range from 20 to 1500° C. to dry, with or without sintering or calcining, the catalysts and/or catalyst precursors.

In this process, the adhesiveness of the channels (e.g. of the inner surface of the tubes) of the body or of the catalyst supports can be increased prior to the coating by chemical, physical or mechanical pretreatment of the inner walls of the channels (e.g. inner tubes) or the catalyst supports or by applying an adhesive layer. This applies in particular to the processes a) and c) and to b) and d) respectively.

Process e comprises the following steps:

e1) reacting predetermined dry porous catalyst supports with one or more reactive gases for preparing predetermined supported catalysts outside or inside the body, e2) if appropriate introducing the supported catalysts prepared outside the body into predetermined channels of the body, and e3) if appropriate heating the filled body in the presence or absence of inert gases or reactive gases to a temperature in the range from 20 to 1500° C. to dry, with or without sintering or calcining, the catalysts.

Process f) comprises the following steps:

f1) coating and if appropriate heating predetermined catalyst supports to prepare predetermined supported catalysts in the manner defined above in processes b) and d) outside the body, f2) introducing the supported catalysts into predetermined chapels of the body, f3) if appropriate heating the packed body in the presence or absence of inert gases or reactive gases to a temperature in the range from 20 to 1500° C. to dry, with or without sintering or calcining, the catalysts.

Preferably, the external shape of the supported catalysts corresponds here to the shape of the channel interior in the body at least essentially, preferably approximately or completely.

Process g) comprises the following steps:

g1) simultaneous or sequential coating of the channels of the body with gasified chemical elements or their mixtures of the chemical elements present in the catalyst, and g2) if appropriate heating the coated body in the presence or absence of inert gases or reactive gases to a temperature in the range of from 20 to 1500° C. to dry, with or without sintering or calcining, the catalysts and/or catalyst precursors.

Process h) comprises the following steps:

h1) simultaneous or sequential coating of the channels of the body with pulverulent chemical elements or their mixtures of the chemical elements present in the catalyst, and h2) if appropriate heating the coated body in the presence or absence of inert gases or reactive gases to a temperature in the range of from 20 to 1500° C. to dry, and if appropriate sinter or calcine, the catalysts and/or catalyst precursors.

The invention also relates to inorganic heterogeneous catalyst arrays which are obtainable by one of the abovementioned processes. The arrays can also be prepared by any combination of the abovementioned processes.

The processes are suitable for preparing a multiplicity of catalyst systems, as are described, for example, in G. Ertl, H. Knözinger, J. Weitkamp, editors, "Handbook of Heterogeneous Catalysis", Wiley-VCH, Weinheim, 1997.

In addition, the invention relates to a process i) for determining catalytic properties, in particular the activity, selectivity and/or long-term stability of the catalysts described above and below in an array described, which comprises the following steps:

i1) if appropriate activating the catalysts in the body, i2) heating or cooling the body to a desired reaction temperature, i3) passing a fluid reactant or a fluid reaction mixture through (one, a plurality or all of the) channels of the body, i4) (preferably separate) discharge of the reacted fluids from individual or a plurality of collective channels of the body, i5) (preferably separate) analysis of the discharged reacted fluids, i6) if appropriate comparative evaluation of the analytical results of a plurality of analyses.

In a preferred process variant, after heating or cooling the body to a first reaction temperature in step i2), steps i3) to, i6) are carried out successively for a plurality of different fluid reactants or fluid reaction mixtures, where in each case a purge step with a purge gas can be introduced, and then the body can be heated or cooled to a second reaction temperature and the abovementioned reactions can be repeated at this temperature.

At the start of the analysis, the collected gas stream of the entire array can be analyzed to detect whether there has been any reaction at all. Thereafter, if a reaction is present, the discharges of the individual tubes or a plurality of tubes can be analyzed to determine an optimum catalyst using a minimum number of analytical processes.

Flow can pass rough individual tubes or a plurality or all of the tubes collectively.

Preferably, the fluid reactant or fluid reaction mixture is a gas or gas mixture.

The invention permits the automated preparation and catalytic testing for the purpose of mass screening of heterogeneous catalysts for chemical reactions, in particular for reactions in the gas phase, very particularly for partial oxidations of hydrocarbons in the gas phase by molecular oxygen (gas-phase oxidations).

Suitable reactions for investigation are described in G. Ertl, H. Knözinger, J. Weitkamp, editors, "Handbook of Heterogeneous Catalysis", Wiley-VCH, Weinheim 1997. Examples of suitable reactions are principally listed in this reference in Volumes 4 and 5 under numbers 1, 2, 3 and 4.

Examples of suitable reactions are the decomposition of nitrogen oxides, the synthesis of ammonia, the oxidation of ammonia, oxidation of hydrogen sulfide to sulfur, oxidation of sulfur dioxide, direct synthesis of methylchlorosilanes, oil refining, oxidative coupling of methane, methanol synthesis, hydrogenation of carbon monoxide and carbon dioxide, conversion of methanol to hydrocarbons, catalytic reforming, catalytic cracking and hydrocracking, coal gasification and liquefaction, fuel cells, heterogeneous photocatalysis, synthesis of MTBE and TAME, isomerizations, alkylations, aromatizations, dehydrogenations, hydrogenations, hydroformylations, selective or partial oxidations, aminations, halogenations, nucleophilic aromatic to substitutions, addition and elimination reactions, oligomerizations and metathesis, polymerizations, enantioselective catalysis and biocatalytic reactions.

The invention is described in more detail below with reference to preferred embodiments.

Preparation of the Inorganic Heterogeneous Catalyst Array

Firstly, two or more, preferably 10 or more, very particularly preferably 100 or more, in particular 1000 or more, especially 10,000 or more, liquid starting mixtures (termed mixtures below) which comprise selected chemical elements of the Periodic Table of the Elements are prepared in the form of solutions, emulsions and/or preferably suspensions (dispersions), the mixtures prepared generally differing in their chemical composition or concentration. To test the reproducibility, a plurality of mixtures of the same composition can also be used.

The liquid mixtures generally comprise a liquid chemical component which is used as solvent, emulsifying aid or dispersant for the other components of the mixture. As solvent or dispersant, use is made of organic solvents, emulsifying aids and/or water, preferably water.

Apart from the chemical elements of the solvent or dispersant the liquid mixtures comprise one or more, preferably 2 or more, particularly preferably 3 or more, chemical elements, generally, however, no more than 50 different chemical elements being present in an amount of in each case greater than 1% by weight. Preferably, the chemical elements are present in the mixtures very intimately mixed, e.g. in the form of a mixture of various miscible solutions, intimate emulsions having a small droplet size and/or preferably as a suspension (dispersion) which comprises the chemical elements in question generally in the form of a finely divided precipitate, e.g. in the form of a chemical mixed precipitate. The use of brines and gels has proved particularly useful, in particular of those which comprise the chemical elements in question in a substantially homogeneous distribution, and preferably those which show an adhesion and flow behavior expedient for the coating. Suitable staring compounds for the chemical elements selected are in principle the elements themselves, preferably in finely divided form, furthermore all compounds which contain the chosen chemical elements in a suitable manner, such as oxides, hydroxides, hydroxideoxides, inorganic salts, preferably nitrates, carbonates, acetates and oxalates, organometallic compounds, alkoxides etc. The respective starting compounds can be used in solid form, in the form of solutions, emulsions and/or in the form of suspensions.

Preferred element compounds, in particular catalytically active metals, are water-soluble oxides, hydroxides or salts of organic or inorganic acids. Active metals are preferably located in the subgroups of the Periodic Table of the Elements, for example in subgroups 5 and 6 for oxidation catalysts and in the platinum group for hydrogenation catalysts. The process according to the invention also permits the screening of (atypical) elements which were not previously considered to be catalytically active, in particular metals or metal oxides.

In addition, the liquid mixture can comprise other compounds which affect the adhesion properties and the flow behavior of the liquid mixture on the channel interior or tube interior to be coated or catalyst supports and thus affect the coating properties of the liquid mixture. Organic compounds which may be mentioned here are, for example, ethylene glycol or glycerol, as described in DE-A 4 442 346, or, for example, maleic acid copolymers, and inorganic compounds which may be mentioned are, for example, $SiO_2$, organosilicone compounds or siloxanes.

In addition, the mixtures can comprise known inorganic support materials, such as $Al_2O_3$, $ZrO_2$, $SiO_2$, $Y_2O_3$, $TiO_2$, activated carbon, MgO, SiC or $Si_3N_4$, which generally increase the surface area accessible to the catalysis of the catalytically active chemical elements present in the mixture and in addition can affect the catalytic properties of the active composition present and which likewise can affect the adhesion and flow properties of the resultant mixture. Generally, coatings are obtained in this case which comprise, in addition to the actual catalytic material, the preferred oxide, nitride or carbide support material. However, when the components are being mixed or during the subsequent heating of the coating, said support material can also react with the chemical elements used above it to form a novel solid material.

Furthermore, the mixtures used can additionally comprise an inorganic and/or organic binder or a binder system which stabilizes the mixture used. Binders suitable for this are, for example, binders or binder systems which comprise metal salts metal oxides, metal hydroxide oxides, metal hydroxide oxide phosphates and/or eutectic compounds melting at the service temperature of the catalyst.

The mixture can in addition be set to a defined pH range by adding acids and/or bases. In many cases, pH neutral suspensions are used. For this purpose, the mixture can advantageously be set to a pH between 5 and 9, preferably between 6 and 8. Special results may be obtained by the process according to the invention if the mixture has a high solids content of up to 95% by weight, preferably from 50 to 80% by weight at low viscosity. If precipitation is insufficient, precipitation aids, such as ammonia, can be added.

In a preferred embodiment of the invention, the mixture is stirred after, and generally also during, the preparation and its flowability is measured continuously, but at least at the end of the preparation. This can be done, for example, by measuring the power consumption of the agitator unit. Using this measurement the viscosity of the suspension can be set, for example by adding further solvents or thickeners, so as to result in optimum adhesion, layer thickness and layer thickness uniformity on the tube inner wall to be coated or on the auxiliary support (catalyst support) to be coated.

In principle, the invention is not restricted to certain catalyst materials and catalyst compositions. The preparation of the mixture can be performed in parallel or successively and is generally performed in automated form e.g. using an automated pipette or automated pipetting system or else an ink-jet process, as described, for example, in U.S. Pat. No. 5,449,754.

To coat the tubes of the tube-bundle reactor or heat exchanger by process variant a), solutions, emulsions or suspensions of individual elements or element compounds can be introduced into the tubes simultaneously or successively separated from one another. Simultaneous introduction can be performed, for example, using a modified inkjet printer head which comprises separate feed lines for the individual solutions, emulsions or suspensions and permits the simultaneous atomization. Compared with this process variant a the process variant b is preferred, which is carried out in particular as follows:

To prepare the catalysts or their precursors, solutions, emulsions and/or suspensions of the required elements are firstly prepared in separate vessels. These are frequently metal salt solutions, for example nitrates. The amounts of the separate solutions required to prepare a catalyst or catalyst precursor are transferred in the desired ratio into a small separate reaction vessel in which the components are intensively mixed. They can be metered, for example, using automated pipettes or an inkjet unit. When the components are mixed, a reaction or precipitation of the components can occur. Using precipitants such as ammonia, precipitation is induced or completed if necessary, so that a suspension of the mixed catalyst precursor material is frequently present.

Since the suspension should have a suitable viscosity to be able to be introduced into a tube of the tube-bundle reactor and distributed, so as to give a distribution of the catalyst or catalyst precursor on the tube inner wall as uniform as possible and substantially adherent, if necessary the suitable suspension viscosity can be set to the desired value as described above by further additives. The suspension can be withdrawn from the reaction vessel in his case, for example, using pipettes, and distributed in the tube, as described below, by injection or atomization. The reaction vessel can in this case be completely or partially emptied. A plurality of reaction vessels can be operated in parallel, or one reaction vessel, after partial emptying, can be refilled with other components, to achieve an altered composition.

The mixtures prepared are coated, preferably using an injection process, onto various parts of an, in particular, metallic tube reactor or heat exchanger, in particular onto the tube inner walls of (preferably metallic) reaction tubes of a tube-bundle reactor at a 10–2000 µm thick layer, generally each tube being coated with a mixture of differing composition (to test reproducibility, a plurality of mixtures of the same composition can also be used in a plurality of tubes).

To test layer thickness effects (such as transport effects), the same catalyst compositions can also be applied at different layer thicknesses to different tubes.

In a further variant of the invention, auxiliary supports (preferably metallic or ceramic tubes) are used which have been coated with the liquid mixture after, or preferably before, insertion into the reaction tubes of a tube-bundle reactor.

Auxiliary supports which can be used here are tubes having any desired cross section, preferably circular. The material of the auxiliary supports can be chosen freely, for example the auxiliary supports can be made of glass, metal, activated carbon, graphite, ceramics such as glass ceramics or sintered quartz. The material in this case can be densely sintered or porous. Porous metals in this case are, for example, sintered metals, metal gauzes, knitted metal fabrics, metal felts or wire meshes. From the reaction aspect, precisely metals offer great advantages with respect to their properties, for example their thermal conductivity, especially if it is expected that large amounts of heat must be removed or an exact temperature control is necessary. In addition, the metallic supports can already be the active composition. The tubes in this case can also be segmented in such a manner that a plurality of channels, preferably in parallel to one another, extend in parallel to the longitudinal tube axis. The cross section of such tubes can resemble a spoked wheel, for example. An outer tube and an inner tube can also be connected by a multiplicity of through-spokes. The number of the spokes can be chosen freely here.

As porous materials, the auxiliary supports can also be solid, provided that they preferably have a high porosity. They can be made up, for example, from foams of the abovementioned materials. The solid bodies can have any desired suitable shape. Suitable shapes are, for example, cylinders, cones, disks, sheets etc.

Suitable auxiliary supports are offered, for example, by ROBU Glasfilter-Geräte GmbH, D-57644 Hattert as sintered filters, by PoroCer Keramikmeinbranen GmbH, D-07629 Hermsdorf as tubular membranes for cross flow filtration, by Tami Deutschland GmbH, D-07629 Hermsdorf/Thüringen as ceramic tubular membranes for cross flow filtration and by Hi-Tech Ceramics, a Vesuvius Group Company, Alfred, N.Y. 14802, USA as RETICEL ceramics. Clearly, products from other suppliers can also be used.

The arrays according to the invention are preferably prepared using auxiliary supports of this type by process f), as described above. In this process, the auxiliary supports are preferably coated outside the body and if appropriate heated. After the supported catalysts prepared in this way have been introduced into the predetermined channels of the body, the packed body is if appropriate heated to dry the catalysts, with or without sintering or calcining. The above described supported catalysts can have here the auxiliary supports as catalyst supports.

Coating the bodies or the preferred heat exchanger is described in more detail below.

The parts of the, preferably metallic, heat exchanger which have been coated with the liquid mixture prepared in advance are preferably the tube inner walls of, preferably, metallic tube-bundle reactors. The reaction tubes of the tube-bundle reactor can have any desired cross section, but generally have a round and, in particular, circular cross section. The inner diameter is preferably from 0.2 to 70 mm, preferably from 1 to 25 mm, particularly preferably from 3 to 10 mm. The tube-bundle reactor can comprise up to 30,000 reaction tubes or more, preferably from 10 to 20,000, particularly preferably from 100 to 10,000 reaction tubes, which are generally each provided with a coating of differing composition.

The coating with liquid mixtures can be applied by sponging, sly, brushing, centrifuging, spraying and/or dipping. Furthermore, the mixture can be poured into the individual tubes and centrifuged at rotary speeds from 200 to 1000 rpm, preferably at rotary speeds from 300 to 800 rpm. In a preferred embodiment, the coatings on the inner side of the reaction tubes are prepared by spraying on the abovementioned liquid mixture. The sprayed-on mixture material is forced in the course of this into the surface roughnesses of the substrate, air bubbles below the coating being prevented. The mixture used can then adhere completely to the sprayed interior. However, in particular in the case of low adhesion and/or low viscosity of the mixture, some of the mixture can be discharged again by dripping off. The auxiliary supports to be coated, e.g. in the form of inner tubes, can be completely or only partially coated. In this case, in particular the respective reactor tube inlet and reactor tube outlet can be spared from the coating by a suitable apparatus, in order to prevent any later-occurring sealing problems with the feed and discharge apparatuses to be connected for the fluid.

However, a treatment of the freshly impregnated porous support composition with a reactive gas can be of great interest precisely in the parallelized production of small amounts of substances by processes a) to d). Thus, for example, by treating with ammonia gas a porous support composition which has been freshly impregnated with a metal nitrate solution, metal hydroxides or oxide hydrates can be precipitated on the support. The advantage over the described treatment of the porous support composition with dispersions is the finer distribution of the active component on the support which is potentially achievable. Other reaction gases, for example hydrogen sulfide, carbon monoxide or prussic acid are also conceivable candidates for this preparation process. Those which are of particular interest for treating the freshly impregnated support compositions are, for example, the reactive gases ammonia, hydrogen sulfide, prussic acid and carbon dioxide. Preferably, by means of the treatment with reactive gases a working step, that is to say preparing dispersions of the active components, can be saved, since the salt solutions of the active components are employed directly.

To achieve particularly thick layers or particularly homogeneous coatings, the reaction tubes can be coated repeatedly successively. In this case, separate drying steps and/or calcining steps and/or sintering steps can be connected in-between the individual coatings of a reaction tube. The inner wall, in the case of spraying, is advantageously coated using one or more atomizer lances, preferably using one or more movable atomizer lances. In this case, the atomizer lance is drawn through the tube to be coated at a defined constant or varying speed during the atomizing operation, e.g. using an automatic apparatus.

The thickness of the applied layer after dying, with or without calcining or sintering, is preferably from 10 to 2000 $\mu$m, particularly preferably from 20 to 500 $\mu$m.

In addition, before the coating on the inner tube, an adhesion promoter and subsequently on this adhesion promoter a covering layer which comprises a catalyst material and is catalytically active can be applied. The adhesion promoter can increase the adhesion of the catalytically active covering layer on the inner tube. Moreover, when an adhesion promoter is used, the service lives can be increased. Suitable adhesion promoters are described above.

In addition, the adhesion of the catalytic layer can be increased by a chemical, physical or mechanical pretreatment of the inner tube prior to the coating. In the event of a chemical pretreatment, the inner tubes can be pickled, for example by lyes or preferably by acids. Furthermore, the inner tube can be roughened by blasting with a dry blasting medium, in particular corundum or quartz sand, to reinforce the adhesion. Furthermore, cleansers which are a suspension of hard particles, e g. corundum, in a dispersion fluid, have also proved useful.

Furthermore, the coating on the preferably metallic inner tube can comprise the constituents auxiliary support and a covering layer which comprises a catalyst material and is catalytically active, as is described, for example, in DE-A-19 600 685. In this case, the auxiliary support preferably has an external shape which at least essentially corresponds to the geometry of the surface to be coated. Suitable auxiliary supports here are, as described above, for example, metallic or ceramic bodies, e.g. wire braidings or metal or ceramic tubes. In this case, at least the auxiliary support, and preferably only the auxiliary support, is coated with the catalytically active covering layer and the coated auxiliary support is arranged in the entire reaction inner tube, or preferably in a part of the reaction inner tube. In this tube-in-tube arrangement, the outer tube can have, for example, a tapering at one end, in order to prevent the inner tube from falling out, and at the other end the projecting inner tube can be pushed into the outer tube, for example, by springs or a springy material.

The treatment of the dry porous support substances with reactive gases in accordance with process e) can also lead to materials of catalytic interest. Thus, for example, by simple treatment of sintered metals with hydrogen or carbon monoxide, oxidic surfaces can be removed and thus potential active compositions can be generated. Or, thin coatings of salts may be prepared from metallic supports using gases such as $H_2S$, $HCl$ or $SO_2$, which salts are also active components of potential interest.

Gases of interest for such methods of preparation are, for example, $CO$, $NH_3$, $N_2$, $H_2S$, $H_2$, $HCl$, $H_2S$, $O_2$, $Cl_2$, $SO_2$, $SO_3$, prussic acid, vapors of organic solvents, etc.

The particular feature of the process according to the invention is that each auxiliary support in the tube-bundle reactor used generally has a different composition or a different layer thickness of the catalytic coating. Furthermore, the coated auxiliary supports can readily be exchanged for other auxiliary supports having different coatings. For example, by means of a suitable reactor construction (provision of shut-off valves etc.) changing individual auxiliary supports during the reactor operation can be possible.

Processes g) and h) describe procedures in which the use of a solvent for application onto the porous support is completely dispensed with. Processes g) of interest, which can also be carried out in an uncomplicated manner, are those in which the active component is applied to the support via the gas phase. Thus sputtering or CVD processes can be used. Multicomponent mixtures of active substances could be generated by sequential preparation steps, by suitable mixing of the gaseous reactants or, for instance, by sputtering with multicomponent targets.

Also of interest for the application of active compositions is the direct application of a solid substance which is a precursor of the active composition, see process h).

In this case processes can be used utilizing electrostatic charging, similar to the situation as in customary coating methods (powder coating: CD Römpp Chemie Lexikon [R ömpp's chemistry lexicon]—Version 1.0, Stuttgart/New York: Georg Thieme Verlag 1995; Powder Coating (Eletrostatic Spraying) Ullmann's Encyclopedia of Industrial Chemistry, Sixth Edition, 1998, Electronic Release, 1998, Wiley-VCH, D 69451 Weinheim, Germany). By subsequent treatment (for example thermal, using reaction gases), the contact between the solid porous support composition and the solid precursor substance can be generated. A high degree of automation makes this technique appear particularly attractive.

When the coated tube-bundle reactor is heated under vacuum or a defined gas atmosphere to temperatures of from 20 to 1500° C., preferably from 60 to 1000° C., particularly preferably from 200 to 600° C., very particularly preferably from 250 to 500° C., the coating applied in advance is freed from solvent, if present, by drying. At an elevated temperature, furthermore, sintering or calcining of the particles forming the coating can occur. In this process, the actual catalytically active coating is generally obtained.

To regulate the temperature, the reaction tubes are preferably surrounded by a heat-carrier medium, for example by a salt melt or liquid metal such as Ga or Na. In this case, the liquid heat-carrier medium is fed and removed, preferably at opposite points of the tube-bundle reactor, e.g. using a pump, in order to lead it then through a (e.g. air-cooled) heat exchanger to remove or deliver heat. The heat-carrier medium ensures, firstly, that the temperature for the drying, for any following sintering of the coating and subsequent fluid-phase test reaction, is set in the reaction tubes. Secondly, the heat-carrier medium removes the heat produced in the following test reaction and thus suppresses the formation of hot spots along the catalyst coating, in which, locally, a higher temperature prevails than in the remaining catalyst coating.

This type of reaction procedure ensures that the heat produced in the reaction is removed outstandingly well, so that virtually no hot spots occur any longer.

In a further embodiment of the invention, the space between the reaction tubes is filled with a solid material, preferably a metal or a solid metal alloy. In this case, the tube-bundle reactor transforms into a material block as described above, in particular a metal block having channels or boreholes. The inner diameter of the boreholes corresponds to the inner diameter of the reaction tubes of the tube-bundle reactor here.

It is also possible to prepare differing heterogeneous catalysts having a predetermined composition in the form of unsupported catalysts or supported catalysts by known, for example combinatorial, processes and to charge in each case one or more predetermined tubes of the tube-bundle reactor or heat exchanger with each of these preprepared heterogeneous catalysts. In this case, the known types of shaped bodies can be used. For each individual tube, it is possible to vary the bed height or the inert content of a bed or to establish other bed parameters.

The catalysts are tested by reacting fluid reactants or reaction mixtures which are generally present in the liquid, or preferably gaseous, state. Preferably, oxidation catalysts are tested by supplying, in parallel or in succession, individual, a plurality or all tubes of the coated tube-bundle reactor with a gas mixture of one or more saturated, unsaturated or polyunsaturated organic starting materials (e.g. hydrocarbons, alcohols, aldehydes etc.), oxygen-containing gas (e.g. air, $O_2$, $N_2O$, NO, $NO_2$, $O_3$) and/or, for example $H_2$, with or without an inert gas, e.g. nitrogen or a noble gas, at temperatures of from 20 to 1200° C., preferably at from 50 to 800° C., particularly preferably at from 80 to 600° C., the separate removal of the respective gas streams, performed in parallel or in succession, from the individual, plurality or all reaction tubes of the tube-bundle reactor being ensured by a suitable apparatus.

A gas mixture, consisting of, for example, an oxygen-containing gas (e.g. air, $O_2$, $N_2O$, NO, $NO_2$, $O_3$) and/or $H_2$ and the organic starting material to be reacted (for example propene or o-xylene) is, for example, passed through the generally differently coated reaction tubes of the tube-bundle reactor. In addition to said gaseous substances, other gaseous substances, such as Cl- or P-containing substances, can also be present. The gas mixture can be passed here in succession through the individual reactor tubes. In the preferred embodiment, the gas mixture is passed through the reaction tubes in such a manner that the gas mixture flows through all tubes simultaneously. In this case, during the start-up of the reaction, i.e. during the time that the catalytic coatings are activated, the composition of the feed, the temperature of the heat-exchange medium or the reaction tube, the residence time of the feed and/or the pressure of the total gas in the tube-bundle reactor can be changed. The product gases leaving the respective reaction tube, which gases are produced by reaction of the reaction gases used, are generally removed separately, but may also be removed collectively, and are analyzed by diverse probes or analytical methods, e.g. with respect to their composition.

The coated tube-bundle reactor can also be supplied with said gas mixture directly after the suspension coating (omitting the drying and sinter or calcining), in this case the drying process and following sintering process taking place under said gas mixture. In this case, the composition of the inner tube coating can change. In particular, oxidic coatings, under highly reducing conditions, can partially or completely release their oxygen or, under highly oxidizing conditions, can take up oxygen into their structure.

A constant gas mixture can be fed to the individual differently coated reaction tubes of the tube-bundle reactor, for example via a gas supply hood which can be mounted essentially gas-tightly onto the tube-bundle reactor.

The gases used can be mixed prior to the feed into the gas supply hood, or not until this, e.g. using a static mixer.

The individual reaction gases can be removed via an apparatus mounted essentially gas-tightly on the tube-bundle reactor, the individual reaction gases of the individual, plurality of, or all reaction tubes being removed separately and then analyzed separately via a valve switching.

Another way of removing separately the individual exhaust gases of the respective generally differently coated reaction tubes is a, for example, computer-controlled mechanically moved "sniffing apparatus" having a sniffing line for the gas to be taken off, which line is positioned essentially automatically on, in, or over the exit of the respective reaction tube and then takes off a reaction gas sample. The positioning and takeoff of the respective reaction gas is preferably carried out here in such a manner that only the actual reaction gas to be analyzed later, and no additional external gas from outside, passes into the sniffing line. If the sniffing apparatus is positioned on the reaction tube end, an essentially gas-tight application of the sniffing line to the reaction tube end, e.g. by pressing the sniffing apparatus onto the end face of the tube reactor, is advantageous. If the sniffing apparatus is positioned in or above the exit of the respective reaction tube, it is advantageous to suck the reaction gases into the sniffing apparatuses via a reduced pressure set in the sniffing line in such a manner that the amount of the sucked-in reaction gases is limited, so that no additional external gases are drawn into the sniffing line. In the event that the sniffing line is positioned in the exit of the respective reaction tube, it has proved particularly advantageous if the end of the sniffing line is tapered in such a manner that inserting the sniffing line into the end of the respective reaction tube ensures that the reaction gases exiting from the reaction tube in question are essentially sealed gas-tightly from the exterior. After reaction gas has been taken off from the reaction tube in question of the tube-bundle reactor, the sniffing apparatus is, preferably automatically, positioned on, in or over another reaction tube, generally the next exit of a further reaction tube, in order to effect the next gas takeoff. In his manner, all exhaust gases of the reaction tubes can be delivered separately for a sample and then analyzed. It is not only possible for the positioning to move on, in or over the reaction tube exit, and the tube-bundle reactor to remain fixed, but the sniffing line can remain fixed during the positioning and for the tube-bundle reactor to be moved correspondingly. During the positioning, both the sniffing apparatus and the tube-bundle reactor can also move. In a preferred process variant, the tube-bundle reactor remains unchanged and only the sniffing apparatus is moved during the positioning above or onto the respective reaction tube ends. In another preferred process variant, the tube-bundle reactor, during the positioning, experiences a rotary movement around its axis, while the sniffing line, during a positioning over the respective reaction tube ends, carries out a linear motion in the direction toward the axis of rotation of the tube-bundle reactor, while, when it is positioned onto the respective reaction tube ends, the sniffing apparatus carries out an additional motion parallel to the reactor axis. A plurality of sniffing apparatuses can also be used simultaneously for sampling the various reaction gases. In addition, a plurality of combined tubes can also be sampled.

In a similar manner to the removal of gas via what are termed sniffing lines, as an alternative to the gas supply hood, the gas can be fed via such a principle, the individual tubes being tested sequentially. Obviously, the exhaust gas sniffing line must then be positioned synchronously with the feed line for fresh gas.

The catalytic performance of the individual catalytic coatings of the individual reaction tubes can be screened by chemical analysis of the respective gas streams using suitable methods known per se. The gas streams removed individually from the individual reaction tubes of the tube-bundle reactor are in this case analyzed individually for their composition, e.g. using suitable apparatuses, e.g. via gas chromatography using flame ionization detection and/or thermal conductivity detection, or, for example using mass spectrometry. The gas composition obtained is analyzed here in particular with respect to its relative content of desired product, or of various desired products, and the resultant concentrations related to the reacted starting material, values for the respective conversion rates (activity) and product selectivities being produced. In many cases it is useful here to measure the product selectivities of the individual catalysts over a relatively long time period of generally hours to a number of weeks. In the selection of the catalyst coating most suitable for the respective reaction, in order to limit the number of gas analyses, it can be useful to make repeat measurements only on gas compositions of selected reactor tubes which exceed a desired limiting concentration or limiting selectivity of certain products.

After the catalytic test, the catalytic inner coatings applied can be removed, so that the remaining tube-bundle reactor is again accessible to a renewed catalytic coating.

The catalyst coatings can be renewed by at least essentially clearing off the old catalytically active covering layer of the coating and applying a new catalytically active coating by sponging, brushing, centrifuging, spraying and/or dipping. Expediently, a choice is made of the same coating process which was used to apply the catalytic coating previously removed. The old catalytically active covering layer of the coating can be cleared off in a simple manner in particular by blasting with a blasting medium, e.g. corundum, silicon carbide, fine sand or the like. Alternatively, treatment with steam or the use of chemical clearing methods has also proved useful.

An efficient method of removing the inner coatings, for example after the catalyst testing, is the use of brushing devices, e.g. similarly to a bottle brush, in general in combination with the described cleansers. Preference is given to the removal of the inner coatings by an at least substantially automated route.

The process according to the invention can readily be carried out in automated form by automated systems. Coating tubes with the catalyst ensures an optimal flow of the fluid, causes only a low pressure drop and prevents blockages in the individual reaction tubes of the tube-bundle reactor.

The spatial separation and clear assignment of the tested coatings offer the advantage of being able to test simultaneously, using one apparatus (tube bundle), a number of materials, generally corresponding to the number of tubes, in parallel with reduced cost and time consumption.

Furthermore, in comparison with other systems, e.g. perforated plates, CVD arrays, etc., the tube-bundle reactor offers the advantage of testing in a manner as close as possible to an industrial process (scale-up capacity is retained). An industrially relevant optimization can be carried out very rapidly and cost-effectively, in particular also, because a multiplicity of catalysts can be tested in parallel/simultaneously under the same conditions,

We claim:

1. A process for preparing arrays of heterogeneous catalysts, heterogeneous catalyst precursors, or combinations thereof, comprising a body having through-channels and in which at least n through-channels comprise n different heterogeneous catalysts, heterogeneous catalyst precursors, or combinations thereof, where n is at least one 2, comprising the following steps:

a1) preparing solutions, emulsions or dispersions of elements or element compounds of the chemical elements present in the catalysts, catalyst precursors, or combinations thereof and, optionally, preparing dispersions of inorganic support materials, a2) optionally, introducing adhesion promoters, binders, viscosity regulators, pH regulators or solid inorganic supports into the solutions, emulsions or dispersions, a3) simultaneously or successively coating the channels of the body with the solutions, emulsions or dispersions, a predetermined amount of the solutions, emulsions or dispersions being introduced into each channel to obtain a predetermined composition, to produce freshly impregnated moist channels, a4) treating and reacting the freshly impregnated moist channels obtained after the coating with at least one reactive gases selected from the group consisting of ammonia, hydrogen sulfide, prussic acid and carbon monoxide to precipitate salt solution of the chemical elements, and a5) optionally, heating the coated body in the presence or absence of inert gases or reactive gases to a temperature in the range from 20 to 1500° C. to dry, optionally with sintering or calcining, the catalysts, catalyst precursors, or combinations thereof.

2. The process as claimed in claim 1, wherein n is at least 10.

3. The process as claimed in claim 2, wherein n is at least 100.

4. The process as claimed in claim 1, wherein the through-channels are parallel relative to each other.

\* \* \* \* \*

UNITED STATES PATENT AND TRADEMARK OFFICE
CERTIFICATE OF CORRECTION

PATENT NO.   : 6,720,171 B2
DATED        : April 13, 2004
INVENTOR(S)  : Schunk et al.

It is certified that error appears in the above-identified patent and that said Letters Patent is hereby corrected as shown below:

Colum 16,
Line 33, "one 2," should be -- one --.

Signed and Sealed this

Fourth Day of January, 2005

JON W. DUDAS
*Director of the United States Patent and Trademark Office*